(12) United States Patent
Tossavainen et al.

(10) Patent No.: US 7,829,130 B2
(45) Date of Patent: Nov. 9, 2010

(54) PROCESS FOR PRODUCING A LACTOSE-FREE MILK PRODUCT

(75) Inventors: Olli Tossavainen, Espoo (FI); Janne Sahlstein, Helsinki (FI)

(73) Assignee: Valio Ltd., Helsinki (FI)

( * ) Notice: Subject to any disclaimer, the term of this patent is extended or adjusted under 35 U.S.C. 154(b) by 981 days.

(21) Appl. No.: 10/513,742

(22) PCT Filed: May 13, 2003

(86) PCT No.: PCT/FI03/00366

§ 371 (c)(1),
(2), (4) Date: Nov. 8, 2004

(87) PCT Pub. No.: WO03/094623

PCT Pub. Date: Nov. 20, 2003

(65) Prior Publication Data

US 2005/0214409 A1  Sep. 29, 2005

(30) Foreign Application Priority Data

May 14, 2002  (FI) ................................. 20020907

(51) Int. Cl.
*A23C 9/14*  (2006.01)
(52) U.S. Cl. ............... 426/580; 426/40; 426/36; 426/491; 426/582; 426/361; 99/59; 99/116
(58) Field of Classification Search ............... 426/40, 426/36, 491, 582, 361; 99/59, 116
See application file for complete search history.

(56) References Cited

U.S. PATENT DOCUMENTS

| | | | | |
|---|---|---|---|---|
| 2,663,642 A | * | 12/1953 | Whitaker et al. ............ | 426/587 |
| 3,753,725 A | * | 8/1973 | Williams et al. ............ | 426/34 |
| 5,685,990 A | * | 11/1997 | Saugmann et al. .......... | 210/650 |
| 5,888,401 A | | 3/1999 | Nguyen | |
| 6,251,459 B1 | | 6/2001 | Schroder | |
| 6,350,481 B1 | * | 2/2002 | Kawachi et al. ............... | 426/72 |
| 6,399,140 B1 | * | 6/2002 | Allen et al. ................. | 426/649 |
| 7,169,428 B2 | * | 1/2007 | Dunker et al. ............... | 426/580 |
| 2004/0040448 A1 | | 3/2004 | Dunker et al. | |

FOREIGN PATENT DOCUMENTS

| | | |
|---|---|---|
| DE | 2354475 | 5/1974 |
| DE | 2354475 A | 5/1974 |
| EP | 02063706 A2 | 12/1986 |
| EP | 0316938 A2 | 5/1989 |
| EP | 1031288 A1 | 8/2000 |

(Continued)

OTHER PUBLICATIONS

Machine Translation of FR 2125137 A (1972).*

(Continued)

*Primary Examiner*—Keith D. Hendricks
*Assistant Examiner*—Hamid R Badr
(74) *Attorney, Agent, or Firm*—Nixon & Vanderhye P.C.

(57) ABSTRACT

The invention relates to a process for producing lactose-free milk products. The process of the invention is characterized by the steps of subjecting a milk product to ultrafiltration (UF), nonfiltration (NF) and concentration by reverse osmosis, followed by the addition of salt to the UF retentate.

8 Claims, 1 Drawing Sheet

FOREIGN PATENT DOCUMENTS

| | | |
|---|---|---|
| FI | B 104783 | 2/1998 |
| FR | 2125137 A | 9/1972 |
| IT | 1308166 | 12/2001 |
| JP | 02-303450 | 12/1990 |
| JP | 06-303900 | 11/1994 |
| JP | 2000-102344 | 4/2000 |
| JP | 2002-502619 | 1/2002 |
| WO | WO 93/22037 | 11/1993 |
| WO | WO 99/40798 | 8/1999 |

OTHER PUBLICATIONS

Machine Translation of DE 2354475 (1974).*
JP-A-2000-102344 (2000). Machine Translation.*
JP-A-6-303900 (1993). Machine Translation.*
Domagk, V.G.F., "Die Herstellung laktosefreier Milch durch Ultrafiltration", *Milchwissenschaft*, 36(10):603-604 (1981).
Wilson, "Turning waste into profit—the fine art of membrane filtration", Environmental Technology Best Practice Programme 1988.
Patel et al, "Manufacture of Low-Lactose Powder Using Ultrafiltration Technology", 1991.
Edelstein et al, "Production of Skim Milk Powder with Lactose Content Reduced by Ultrafiltration", Milchwissenschaft 38 (5) 1983.
Domagk, "Die Herstellung laktosefreier Milch durch Ultrafiltration", Milchwissenschaft 36 (10) 1981.
Hinrichs, "UHT Processed Milk Concentrates", Lait 80 (2000) 15-23, ©INRA, EDP Sciences.

* cited by examiner

PROCESS FOR PRODUCING A LACTOSE-FREE MILK PRODUCT

This application is the U.S. National Phase of International Application PCT/FI03/00366, filed on May 15, 2003, which designated the U.S. and claims priority to FI Application No. 20020907, filed May 14, 2002. The entire contents of these applications are incorporated herein by reference.

OBJECT OF THE INVENTION

The invention relates to a process for producing lactose-free milk products and particularly to the use of different membrane techniques in the production of milk products.

BACKGROUND OF THE INVENTION

Membrane techniques are known separation processes used both at the molecular and ionic levels. Such processes consume little energy and enable the concentration and fractionation of milk. Energy is saved for instance because the use of membrane techniques does not require a phase change in dewatering as do condensation and evaporation.

Generally speaking, membrane filtration processes of four basic types are in use, each of which serves a different purpose of use. According to the separation ability, these four basic types are, from the one having the smallest pore size to the one having the largest pore size, reverse osmosis (RO), nanofiltration (NF), ultrafiltration (UF) and microfiltration (MF). Of these, reverse osmosis is generally used for concentration, ultrafiltration and microfiltration for fractionation, and nanofiltration for both concentration and fractionation.

Microfiltration, ultrafiltration and nanofiltration are membrane separation processes, wherein liquid is filtered through a semi-permeable membrane. A semi-permeable membrane is a membrane that lets through only part of the components in a solution. The system may also comprise a preliminary filter for filtering off the largest or precipitated components.

Osmosis is the spontaneous movement of a liquid through a semi-permeable membrane from a dilute solution through the membrane to a more concentrated solution. In a reverse osmosis device, the flow is reversed by an increase in the pressure of the concentrated solution to exceed the osmotic pressure. Reverse osmosis enables the separation of the dissolved salts. In practice, the liquid (permeate) obtained from reverse osmosis is pure enough to be discharged in a sewer. The most common use of reverse osmosis is the production of drinking water from seawater.

The use of membrane techniques enables the separation of milk components by bringing milk to flow at a raised pressure through a membrane. The components that are smaller than the pore size of the membrane will then pass through the membrane (permeate) and the larger components are retained behind the membrane (retentate). In other words, two flows that leave the separation system are always generated.

During the last decades, the dairy industry has successfully used membrane techniques for instance in the treatment of whey and wastewater. However, an observation has been made in the dairy industry that membrane techniques are extremely well suitable for the treatment of cow's milk, which is known to contain abundant amounts of valuable nutrients and functional compounds. Recent studies have in fact concentrated on the membrane filtration of milk and the use of such filtered milk in the production of dairy products, such as cheese, ice cream and yoghurt.

Special attention has been paid in the studies to the increasing demand for lactose-free milk products during the last few years. It is generally known that some individuals are intolerant to lactose, i.e. cannot tolerate milk products containing a normal amount of lactose. In addition, sometimes it is necessary to ingest low-lactose milk products for some other reason. For example, when an individual has taken antibiotics, the intestinal ability to break down lactose into monosaccharides may be impaired.

Several processes have been presented for eliminating lactose from milk. Generally speaking, the problem in all known processes is a change in the organoleptic characteristics. A well known process in the field is the conventional enzymatic process of eliminating lactose, the process comprising the step of adding lactase into milk, thus resulting in the conversion of more than 80% of the lactose into monosaccharides, i.e. glucose and galactose. Here, the problem is the unacceptably sweet taste of the milk, caused by the monosaccharides.

WO publication 00/45643 discloses a process that aims at retaining the organoleptic characteristics of milk. According to the publication, this is achieved by reducing the amount of lactose so as to reach a lactose to protein ratio of about 1:1, and then treating the milk with lactase in order to convert the residual lactose into monosaccharides. According to the publication, the amount of lactose can be reduced either by ultrafiltration or diafiltration. The essential characteristic of the process presented is the reduction of the lactose to protein ratio. This is also achieved by increasing the amount of protein either by concentrating the original milk or by adding protein into the milk in any process step. The problem in such a process is that in association with ultrafiltration or diafiltration, not only lactose, but also part of the salts that have a clear significance for the taste of milk are also eliminated from the milk. Another hindrance to the use of ultrafiltration is the difficulty in utilizing the by-product, permeate, which contains water, lactose, salts and low-molecular nitrogen compounds.

Finnish publication 104 783 B1 discloses a process for preparing a whey salt powder from whey or a permeate from milk ultrafiltration. The process comprises nanofiltration, concentration and drying of the whey or the permeate. The whey salt powder obtained by the process is usable as a substitute for conventional table salt (NaCl).

EP publication 226 035 B1 discloses a process for specific chromatographic separation of lactose from milk. In the process, milk is fractionated in such a manner that a lactose fraction is separated and the salts remain in the protein fraction or the protein/fat fraction. The advantage of the process is that instead of a permeate, a pure lactose solution is obtained and that all substances significant to the taste, including salts, remain in the milk. However, chromatographic separation is a time-consuming and complex process. Another problem in chromatographic separation is the high purchase price of the equipment, since conventional dairies do not usually have such equipment.

BRIEF DESCRIPTION OF THE INVENTION

The object of the invention is thus to provide a process for solving the above problems. The object of the invention is achieved by a process that is characterized by what is stated in the independent claims. Preferred embodiments of the invention are described in the dependent claims.

The invention is based on the surprising observation that the salts that are eliminated in association with conventional ultrafiltration can be returned to the milk product using the process of the invention, wherein the milk product is ultrafiltered, nanofiltered and concentrated by means of reverse osmosis, followed by the addition of salt to the UF retentate.

The thus obtained low-lactose milk product can then be subjected to hydrolysis, where the residual lactose is converted into monosaccharides by means of the lactase enzyme, resulting in a substantially lactose-free milk product.

An advantage of the process of the invention is that the organoleptic characteristics of the milk product are retained. In addition, in the process of the invention, the outflows generated, the NF retentate and the RO permeate, can be easily further processed. The NF retentate contains mostly lactose and water, and the RO permeate contains essentially only water. The obtained RO permeate is pure enough to be used for instance as rinsing water in equipment washing. Another advantage is that the process of the invention enables the production of a milk product containing only components originating from milk. However, this is not necessary to the invention, but in the process of the invention, other substances may also be added to the milk product, if necessary.

BRIEF DESCRIPTION OF THE FIGURES

In the following, preferred embodiments of the invention will be described in detail with reference to the accompanying drawing, in which.

DETAILED DESCRIPTION OF THE INVENTION

Figure 1:
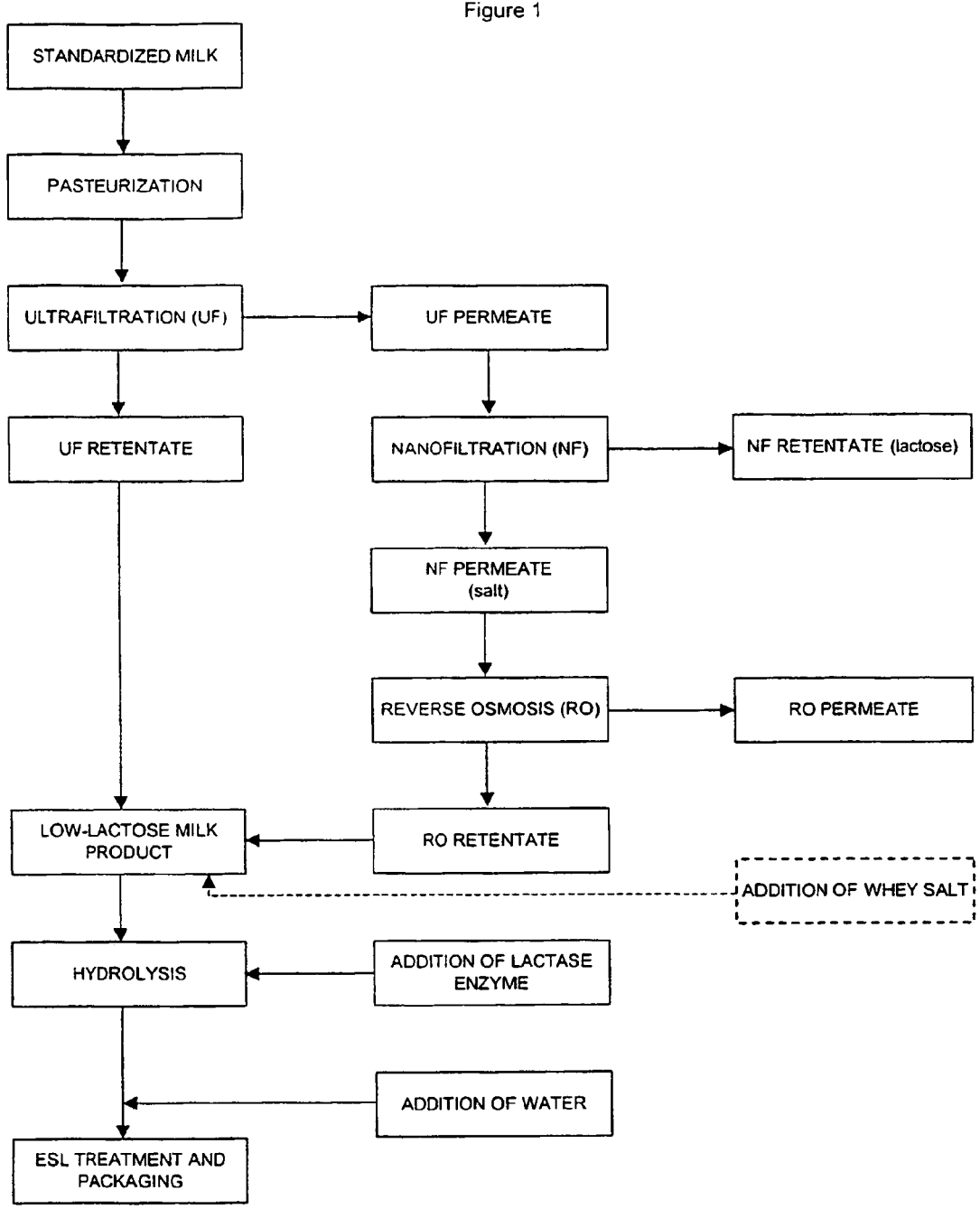
FIG. 1 shows a block diagram of a process of an embodiment of the invention.

The invention relates to a process for producing a lactose-free milk product, characterized by the steps of subjecting the milk product to ultrafiltration, nanofiltration and concentration by reverse osmosis, and adding salt to the UF retentate. The process of the invention enables the elimination of lactose from the milk without any effect on the organoleptic characteristics of the milk product to be produced, since the salts that are eliminated in association with the elimination of lactose can be restored and/or replaced.

The process of the invention preferably comprises the steps of
a) ultrafiltering milk,
b) nanofiltering the UF permeate obtained from the ultrafiltration,
c) concentrating the NF permeate obtained in step b) by reverse osmosis,
d) using the RO retentate obtained in step c) as a salt to be added to the UF retentate.

In an embodiment of the invention, in addition to or instead of the salt contained in the RO retentate obtained from the same production process, another salt is added to the UF retentate. The salt to be added is preferably whey salt, which is for instance a RO retentate prepared from a whey nanofiltration permeate or chromatographically separated salt powder. The whey salt to be added can be either pulverized or a solution. The UF retentate and the RO retentate made from the milk ultrafiltration permeate and to be added thereto may also originate from different processes.

FIG. 1 shows a block diagram of an embodiment of the invention. In the following, preferred embodiments of the different process steps will be described. In the present publication, the percentages refer to percentages of weight, if not otherwise stated.

Ultrafiltration is preferably carried out by concentration coefficient k=1 to 4, more preferably k=1.5 to 2. The concentration coefficient (k) refers to the weight ratio between the liquid fed to the filtration and the retentate, and it is given by the following formula:

$$k = \frac{\text{feed (kg)}}{\text{retentate (kg)}}$$

The UF permeate generated in the ultrafiltration milk typically contains about 4.3% lactose and about 0.4% ash, its dry matter content being between 5.0 and 5.5%. The UF retentate (k=1.5 to 2) generated in the ultrafiltration contains about 5 to 7% protein, about 4.6 to 4.9% lactose and about 1.0 to 1.2% ash; its dry matter content being between 11 and 14%. Suitable membranes are for instance GR81PP and GR61PP, manufactured by Danish Separation Systems, Denmark.

In the process of the invention, the nanofiltration is preferably carried out by concentration coefficient k=1 to 6, more preferably k=3 to 5. The permeate (NF permeate) generated in the nanofiltration contains mainly univalent salts and urea, its dry matter content being between 0.1 and 0.3%. The NF retentate generated in the nanofiltration contains lactose (about 90% of the dry matter) and its dry matter content is between 20 and 24%. Suitable membranes are for instance Desal 5 (Osmonics Inc., USA) and NF45 (Filmtec, USA).

In the process of the invention, reverse osmosis is preferably carried out by concentration coefficient k=2 to 20, more preferably k=5 to 12. The permeate (RO permeate) generated in the reverse osmosis contains mainly only water. The RO retentate generated in the reverse osmosis typically contains 0.5 to 2% ash, its dry matter content being between 1 and 3%. Suitable membranes are for instance Nanomax-95, manufactured by Millipore Corp., USA.

In an embodiment of the invention, milk is standardized to the desired fat content before ultrafiltration. In milk production, the fat content may vary between 0 and 7%, being preferably between 0 and 4.5%. If the fat content in milk exceeds 7%, then cream is generally involved. The process of the invention can also be used for the production of lactose-free cream.

The milk may also be heat-treated, i.e. pasteurized, before ultrafiltration. Pasteurization refers to the heating of liquid foodstuffs (particularly milk) to a temperature of 60 to 90° C. to destroy pathogens.

The process of the invention also preferably comprises an enzymatic hydrolysis step, wherein the residual lactose is converted into monosaccharides by means of lactase, i.e. β-D-galactosidase. Several different enzymes suitable for use in the process of the invention are commercially available. These include for instance lactases produced by *Kluyveromyces fragilis* (e.g. HA-lactase, Chr. Hansen A/S, Denmark) or lactases produced by *Kluyveromyces lactis* (e.g. Validase, Valley Research Inc., USA). The hydrolysis preferably lasts for 1 to 36 hours and it is performed at a temperature of 5 to 70° C., preferably 6 to 15° C. However, it is to be noted that the manufacturers of commercial enzymes give the optimal hydrolysis conditions for their enzymes in their own instructions.

The dry matter content of the milk product obtained by the process of the invention can be adjusted by the addition of water. On the other hand, the process of the invention can also be used for producing lactose-free milk powder, i.e. the milk obtained is dried. The production of powder is particularly suitable for the production of fat-free lactose-free milk powder, but fatty powders may also be produced.

Before the milk product is packed, the milk can be heat-treated for instance by pasteurization (72° C., 15 s.), by ELS treatment (130° C., 1 to 2 s.) or by UHT treatment (138° C., 2 to 4 s.).

The process of the present invention is particularly suitable for the treatment of cow's milk. However, the term 'milk' refers to any normal secretion obtained from the mammary glands of mammals, such as cow's, goat's, horse's or sheep's milk. The term 'standardized milk' refers to milk whose fat content is normalized at the desired level. The milk product produced by the process of the invention may be for instance milk, yoghurt, curdled milk, curd cheese or a sour milk drink, such as sour milk or buttermilk. The process also enables the adjustment of the dry matter content as desired, the product then being a liquid, jelly or a solid substance. The product obtained by the process of the invention can be either ingested as such or added as an additive to a foodstuff or as part thereof. The foodstuffs can be products of for instance the dairy industry, meat-processing industry, prepared food industry, beverage industry, bakery industry or confectionery industry.

Example 1

30 liters of pasteurized (72° C., 15 s.) milk having a fat content of 1.5% were ultrafiltered at 50° C. with a laboratory scale Labstak ultrafilter at concentration ratio 1.5 using GR61PP membranes having a cut off value of 20,000 Da. Both the obtained retentate (20 L) and the obtained permeate (10 L) were recovered.

The UF permeate (10 L) was further nanofiltered at room temperature by concentration coefficient 4 through Millipore Nanomax-50 nanofiltration membranes, whereby univalent ions passed through the membrane (NaCl retention<65%) (7.5 L). The main component of the UF permeate was lactose which was retained in the retentate portion in the nanofiltration. In nanofiltration, salts were eliminated from the UF permeate, i.e. the lactose portion (2.5 L), and therefore the nanofiltration retentate was suitable for further use as a low-sodium lactose fraction.

The nanofiltration permeate (7.5 L) was concentrated at room temperature using reverse osmosis membranes Nanomax-95 (Millipore) by concentration coefficient 10, whereby the salts contained by the nanopermeate were concentrated in the reverse osmosis retentate (NaCl retention>94%). The thus obtained RO retentate is usable in the production of lactose-free milk in the restoration of salts.

69.2 g UF retentate and 10.5 g RO retentate, and 20.3 g water are mixed and 0.35 g HA lactase (Chr. Hansen A/S, Denmark) are added. The mixture is allowed to hydrolyze at 10° C. for 24 hours, during which time the lactose content drops below 0.01%. Table 1 shows the compositions of the UF retentate and the RO retentate. The composition of the obtained product is very near ordinary semi-skimmed milk and tastes like semi-skimmed milk, but is completely lactose-free (lactose<0.01%).

TABLE 1

Production of lactose-free milk from standardized milk and an RO retentate made from a UF permeate of milk

| Component | UF retentate $k = 1.5$ | RO retentate | Lactose-free milk | Semi-Skimmed milk |
|---|---|---|---|---|
| Total protein, % | 4.79 | 0.34 | 3.35 | 3.3 |
| True protein, % | 4.63 | 0 | 3.21 | 3.14 |
| NPN (×6.38), % | 0.16 | 0.34 | 0.15 | 0.16 |
| Lactose, % | 4.37 | 0.15 | <0.01 | 4.64 |
| Glucose + galactose, % | | | 3.0 | |
| Lactic acid, % | 0.2 | n.m. | 0.2 | 0.2 |
| Fat, % | 2.22 | 0 | 1.5 | 1.5 |

TABLE 1-continued

Production of lactose-free milk from standardized milk and an RO retentate made from a UF permeate of milk

| Component | UF retentate $k = 1.5$ | RO retentate | Lactose-free milk | Semi-Skimmed milk |
|---|---|---|---|---|
| Ash, % | 0.91 | 1.52 | 0.79 | 0.79 |
| Dry matter, % | 12.49 | 1.90 | 8.84 | 10.39 | n.m. = not measured

Fat-free or for instance 3.5% fat-containing lactose-free milk can be produced in the same way. In this case, correspondingly, the starting milk has to be fat-free or have a fat content of 3.5%.

Example 2

30 litres of pasteurized (72° C., 15 s.) milk having a fat content of 1.5% are ultrafiltered at 50° C. at concentration ratio 1.5 using GR61PP membranes having a cut off value of 20,000 Da. Both the obtained retentate (20 L) and the obtained permeate (10 L) are recovered.

Instead of the RO retentate produced from the UF permeate of milk, in cheese dairies, a concentrate (RO retentate) made from the permeate from the nanofiltration of whey is taken, the composition of the concentrate being similar to that of the RO retentate made from the UF permeate of milk (Tables 1 and 2).

69.2 g UF retentate and 10.5 g salt concentrate, and 20.3 g water are mixed and 0.35 g HA lactase (Chr. Hansen A/S, Denmark) are added. The mixture is allowed to hydrolyze at 10° C. for 24 hours, during which time the lactose content drops below 0.01%. Table 2 shows the compositions of the UF retentate and the RO retentate. The composition of the obtained product is very near ordinary semi-skimmed milk and tastes like semi-skimmed milk, but is completely lactose-free (lactose<0.01%).

TABLE 2

Production of lactose-free milk from standardized milk and an RO retentate obtained from nanofiltration of whey

| Component | UF retentate $k = 1.5$ | RO retentate | Lactose-free milk | Semi-Skimmed milk |
|---|---|---|---|---|
| Total protein, % | 4.79 | 0.36 | 3.35 | 3.3 |
| True protein, % | 4.63 | 0 | 3.21 | 3.14 |
| NPN (×6.38), % | 0.16 | 0.36 | 0.15 | 0.16 |
| Lactose, % | 4.37 | 0.13 | <0.01 | 4.64 |
| Glucose + galactose, % | | | 3.0 | |
| Lactic acid, % | 0.2 | n.m. | 0.2 | 0.2 |
| Fat, % | 2.22 | 0 | 1.5 | 1.5 |
| Ash, % | 0.91 | 1.52 | 0.79 | 0.79 |
| Dry matter, % | 12.49 | 1.86 | 8.84 | 10.39 |

The RO retentate obtained from the nanofiltration of whey can be used in the production of lactose-free milk, as can the RO retentate obtained from the UF permeate of milk.

Example 3

The milk produced in accordance with example 1 or 2 can also be dried to a powder. The milk is pasteurized at 75° C.±3° C./3 min. and evaporated to a 40 to 45% dry matter content. It is then fed into a spray drier. Drying with a laminar drier (Filtermat) is performed at the corresponding drying values as normal lactose-hydrolyzed milk powders.

Nozzle pressure 110 to 150 bar
Temperature of nozzle air 185 to 190° C.
Temperature of laminar air 160 to 170° C.
Post-drying 120 to 130° C.
Cooling 20 to 25° C.
Outlet temperature 60 to 65° C.
Target moisture 1.75%, maximum 2.3%

The production of powder is particularly suitable for the production of fat-free lactose-free milk powder, but fatty powders may also be produced.

Example 4

The lactose-free milk products according to examples 1 to 3 can be used for further processing of conventional, but lactose-free products. Lactose-free milk can be used to produce lactose-free cream by adjusting the fat content of the product suitable before the hydrolysis of the lactose. Lactose-free milk can similarly be used to produce sour milk by adding milk souring agent to the milk and letting the milk become sour as in normal sour milk production. Lactose-free ice cream can be produced in the same way as from normal milk. Similarly, almost all feasible milk products can be produced lactose-free by means of conventional production technology. Minor changes in the parameters of the production of the different products may be required when lactose-free milk is used.

It is obvious to a person skilled in the art that as technology advances, the basic idea of the invention can be implemented in a variety of ways. The invention and its embodiments are thus not limited to the above examples, but may vary within the claims.

The invention claimed is:

1. A process for producing a lactose-free milk product, having a ratio of protein to carbohydrates of about 1, comprising the steps of
   a) ultrafiltering milk to obtain a final UF retentate and UF permeate,
   b) nanofiltering the UF permeate obtained from the ultrafiltration of step a) to obtain an NF retentate and NF permeate,
   c) concentrating the NF permeate obtained in step b) by reverse osmosis to obtain an RO retentate and RO permeate,
   d) adding the RO retentate obtained in step c) as a salt directly to the final UF retentate of step a), to produce a milk base and
   e) hydrolyzing lactose in the milk base product by means of lactase to produce a lactose free milk product.

2. The process as claimed in claim 1, comprising adding another salt to the UF retentate besides the RO retentate.

3. The process as claimed in claim 2, wherein the other salt is whey salt.

4. The process as claimed in claim 1, wherein the hydrolysis takes 1 to 36 hours.

5. The process as claimed in claim 4, performing the hydrolysis at a temperature of 5 to 70° C.

6. The process as claimed in claim 1, further comprising the step of conditioning the milk to the desired fat content and pasteurizing it before ultrafiltration.

7. The process as claimed in claim 1, also comprising adjusting the dry matter content of the milk base or the lactose free milk product by adding water.

8. The process as claimed in claim 1, comprising
   a) ultrafiltering the milk by a concentration coefficient 1 to 4,
   b) nanofiltering the UF permeate obtained from the ultrafiltration by a concentration coefficient 1 to 6, and
   c) concentrating the NF permeate obtained in step b) by reverse osmosis by a concentration coefficient 2 to 20.

* * * * *